Patented Dec. 12, 1944

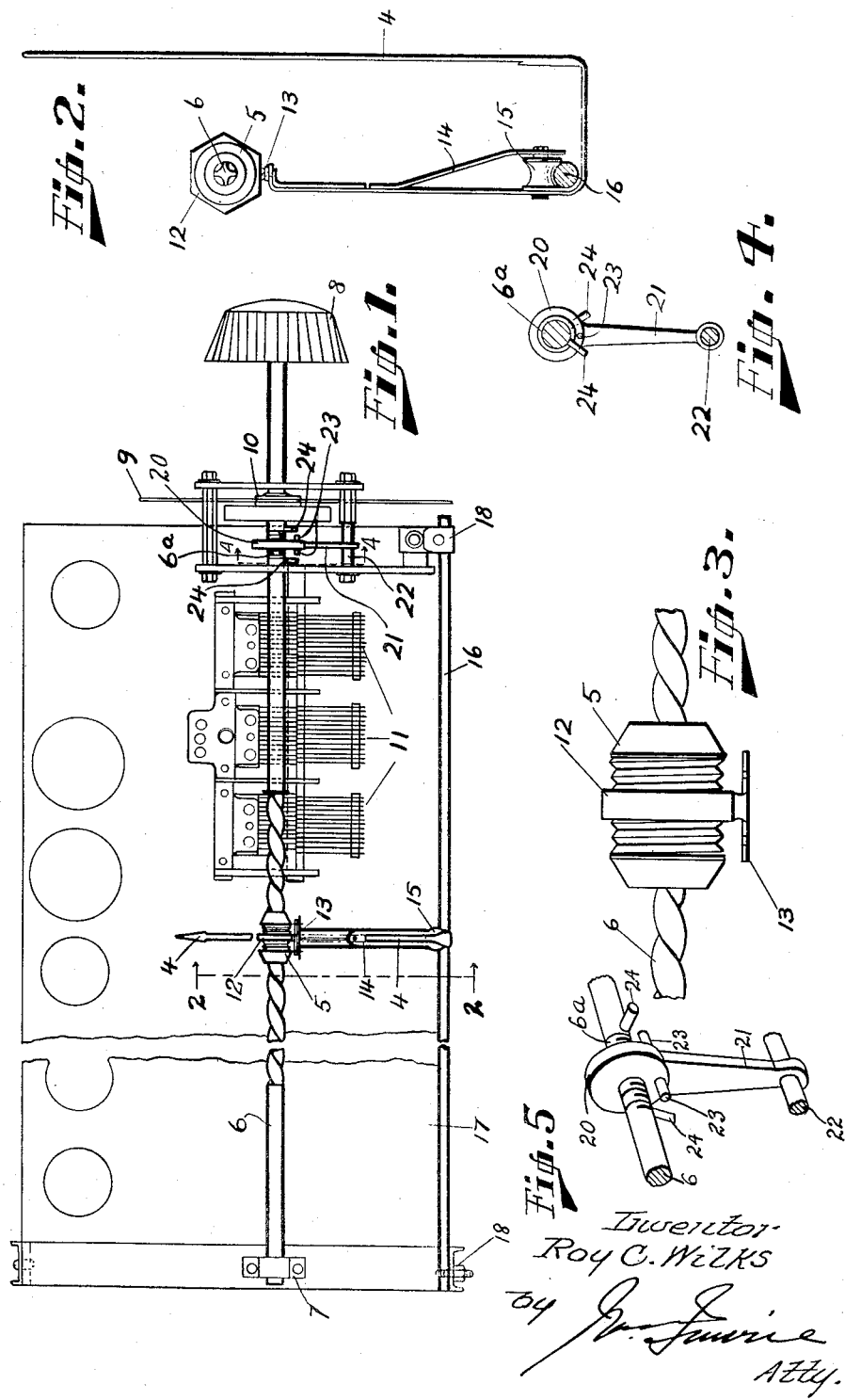

2,364,764

UNITED STATES PATENT OFFICE 2,364,764

TUNING MEANS FOR RADIO RECEIVERS AND THE LIKE

Roy Coles Wilks, Nathalia, Victoria, Australia

Application February 27, 1942, Serial No. 432,689
In Australia April 7, 1941

5 Claims. (Cl. 116—124.1)

This invention relates to tuning means for radio receivers and the like and has particular reference to the means for operating the dial indicator or pointer in synchronism with the tuning means.

Such operating means usually involve pulleys and copper wires or cables in which a spring is interposed in order to maintain a desirable degree of tautness.

It has been found however that in actual use the cables or wires are likely to develop slackness or to break and the springs tend to weaken with the result that the movement and positioning of the pointer in relation to the indicator dial is not properly synchronised with the tuning means. Consequently, although the pointer may be moved to a desired station symbol on the dial, the receiver will not be accurately tuned to that station.

Another defect that applies with particular force where the indicator pointer moves along a straight path, is that the tuning knob is likely to be overturned, especially by children, after the pointer has reached an end of its travel and thus fracture the cable or wire or cause damage to other parts.

The present invention seeks to overcome such objections and to this end it contemplates improved operating means for the indicator pointer which will ensure synchronised movement between the pointer and the tuning means. The improved operating means is devoid of any cables, wires or other parts liable to damage or disorder and once it has been accurately co-ordinated with the tuning means and the indicator dial it will retain that condition indefinitely.

A preferred embodiment of the invention as applied to straight line tuning, i. e., wherein the indicator pointer moves along a straight path, will now be described, with reference to the accompanying drawing in which—

Figure 1 is a view of the chassis of a radio receiver showing tuning and indicating means and operating means therefor in accordance with the invention.

Figure 2 is an enlarged sectional view on the line 2—2 of Fig. 1.

Figure 3 is an enlarged view showing a nut member forming part of the operating means.

Figure 4 is an enlarged section on line 4—4 of Fig. 1.

Fig. 5 is a broken perspective view of the automatic stop mechanism.

According thereto the indicator pointer 4 is in cooperation with a nut member 5 through which passes a screw threaded operating rod 6 that extends at least for the effective length of the indicator dial (not shown) and is suitably journalled at each end in appropriate bearings 7. The rod 6 is adapted to be turned by an operating knob 8 that is affixed to one end thereof and may be located at one side of the receiver cabinet. The rod also has a geared or other appropriate connection, such as friction discs 9, 10, with the tuning means, e. g., a gang of variable condensers 11 so that they are adjusted by the turning of the rod.

In order to prevent the nut member 5 from turning with the screwed operating rod 6 and to cause it to move lengthwise along the same, the nut is provided with a projection for co-operating with a guide member that extends parallel with the screwed rod for the entire length of the indicator dial. In the embodiment illustrated, the nut member is externally screw-threaded to receive a screwed sleeve 12 having a lug 13 to which the inner end of the pointer 4 is secured. A bar 14 is also secured to the inner end portion of the pointer to co-operate with same in supporting a flanged roller 15 that is adapted to track along a guide rail 16 extending parallel with the screwed rod and fixed at its ends to the chassis 17 by clamps 18.

It will thus be evident that by turning the operating knob the screwed rod will be rotated and the nut member (carrying the indicator pointer with it) will be caused to traverse the rod either to the right or the left according to the direction of turning the rod.

The screw threads of the operating rod and of the nut member should be milled or otherwise formed with the utmost precision in order to prevent any back lash between them. The threads may, for example, be of square section, have four starts and a pitch of about one inch to one and a half inches.

The manner of connecting the pointer to the nut member by means of the screwed sleeve 12 is advantageous in that it permits of fine and accurate adjustments being made between the nut member and the pointer, usually at the factory or by distributors of the radio sets. After such adjustments have been made in order to ensure synchronism between the pointer, the indicator dial and the tuning means, the pointer may be made fast with the nut member, as by welding the sleeve to the nut member, so that the desired synchronism will be retained indefinitely.

In cases where the indicator pointer is required to move in a circular path, the nut member may carry a toothed rack that meshes with a toothed pinion having its axis coincident with the axis about which the pointer moves.

The invention also provides a simple and efficient device for resisting overturning or continued turning of the rod 6 after the tuning condensers have reached either limit of their adjusting movement. In this connection, it will be understood that such overturning may arise through slip occurring between conventional friction disks, one of which is shown at 10. According to this feature of the invention (see Figures 1 and 4) the rod 6 has another screw threaded portion 6a which is encircled by a nut 20 at one end of an arm 21 the other end of which is apertured to fit around a guide rod 22 that extends parallel with rod 6. The nut 20 has two outstanding pins or stops 23 for co-operating with pins or stops 24 outstanding from the rod 6 adjacent the ends of the screwed portion 6a.

Thus as rod 6 is turned to operate the tuning means and the indicator, the nut member 20 will be caused to move lengthwise of the rod 6, thus gradually bringing one or other of the pins 23 into position to be engaged by the respective pin 24 whereupon further turning of the rod 6 is prevented. The parts are so dimensioned that such engagements between the pins 23 and 24 will coincide with the arrival of the tuning means in its extreme positions.

Having now described my invention what I claim as new and desire to secure by Letters Patent is:

1. In a radio receiver of the type including tuning elements, a threaded operating rod operable to set the tuning elements, a nut having threaded cooperation with said operating rod, a guide rod below and in spaced parallel relation with the operating rod, and a pointer-assembly connected to said nut and movable thereby in the movement of the operating rod, said pointer-assembly including a U-shaped member having a short leg terminally connected to and depending from said nut, a cross bar underlying and extending transverse the guide rod, and a long leg extending upwardly from the cross bar in substantial parallelism with the short leg, the long leg extending above the operating rod and being terminally formed to provide a pointer, and a roller carried by the short leg and overlying and bearing on the guide rod.

2. A construction as defined in claim 1, wherein the nut is exteriorly threaded, and wherein a sleeve threaded for free initial adjustment on the exterior threads of the nut is connected to the adjacent end of the member, the threaded adjustment of such sleeve on the nut being in the plane parallel to that of pointer movement, and means for fixing the sleeve relative to such nut following initial adjustment of the sleeve.

3. A construction as defined in claim 1, wherein the nut has external threads, and wherein a sleeve adjustable cooperates with said threads, for initial accurate adjustment of the tuning operation, means for fixing the sleeve relative to the nut following such initial adjustment, the end of the member remote from the pointer being connected to said sleeve.

4. A construction as defined in claim 1, wherein the nut is adjusted lengthwise the threaded operating rod by turning the rod, and wherein means are provided for limit turning movement of the operating rod in either direction.

5. A construction as defined in claim 1, wherein automatic means are provided to limit turning movement of the operating rod, with such means including a limit nut threaded on the operating rod, pins projecting from such limit nut, and pins projecting from the operating rod to be engaged respectively by one of the pins of the limit nut in extreme positions of such nut, and means for preventing rotation of the limit nut.

ROY COLES WILKS.